United States Patent [19]

Peng et al.

[11] Patent Number: 4,611,028

[45] Date of Patent: Sep. 9, 1986

[54] POLYMERIC DISPERSION STABILIZER AND STABLE DISPERSIONS PREPARED THEREFROM

[75] Inventors: Stephen C. Peng, Utica; John D. Nordstrom, Detroit, both of Mich.

[73] Assignee: Ford Motor Company, Dearborn, Mich.

[21] Appl. No.: 684,165

[22] Filed: Dec. 21, 1984

Related U.S. Application Data

[63] Continuation of Ser. No. 292,963, Aug. 14, 1981, abandoned, which is a continuation-in-part of Ser. No. 199,874, Oct. 23, 1980, abandoned, and Ser. No. 199,396, Oct. 23, 1980, abandoned.

[51] Int. Cl.$^4$ .................... C08F 8/00; C08F 220/12; C09D 3/00; B01F 17/52

[52] U.S. Cl. .................... 524/850; 524/529; 524/530; 524/531; 524/533; 524/848; 524/853; 524/923; 524/924; 525/244; 525/257; 525/266; 525/277; 525/282; 525/285; 525/286; 525/288; 525/291; 525/293; 525/296; 525/301; 525/303; 525/902; 525/910

[58] Field of Search ............... 524/529, 530, 531, 533, 524/923, 924, 848, 850, 853; 525/244, 257, 266, 277, 282, 285, 286, 288, 291, 293, 296, 301, 303, 902, 910

[56] References Cited

U.S. PATENT DOCUMENTS

| | | | |
|---|---|---|---|
| 3,875,255 | 4/1975 | Kato et al. | 525/286 |
| 3,919,347 | 11/1975 | Katsimbas | 525/286 |
| 3,926,899 | 12/1975 | Nordberg | 525/286 |
| 3,956,225 | 5/1976 | Murato et al. | 524/850 |
| 3,966,667 | 6/1976 | Sullivan et al. | 524/474 |
| 4,025,474 | 5/1977 | Porter et al. | 528/245.5 |
| 4,033,917 | 7/1977 | Sekmakas et al. | 525/286 |
| 4,064,087 | 12/1977 | Das | 525/286 |
| 4,065,518 | 12/1977 | Labana et al. | 525/286 |
| 4,220,679 | 9/1980 | Backhouse | 427/408 |
| 4,242,384 | 12/1980 | Andrew et al. | 428/463 |
| 4,268,547 | 5/1981 | Backhouse | 427/388.5 |
| 4,304,701 | 12/1981 | Das et al. | 525/286 |
| 4,336,177 | 6/1982 | Backhouse et al. | 525/902 |

FOREIGN PATENT DOCUMENTS

| | | | |
|---|---|---|---|
| 2351519 | 4/1974 | Fed. Rep. of Germany | 525/286 |
| 2452074 | 5/1975 | Fed. Rep. of Germany | |
| 1484585 | 9/1977 | United Kingdom | |

OTHER PUBLICATIONS

Barrett, "Dispersion Polymerization in Organic Media", pp. 106-109, John Wiley & Sons 1975.

*Primary Examiner*—Herbert J. Lilling
*Attorney, Agent, or Firm*—Roger L. May; Keith L. Zerschling

[57] ABSTRACT

Copolymers adapted for use as stabilizers in dispersions and stable dispersions, including crosslinked dispersions containing microgel particles, prepared therefrom. Stabilizer bears pendent ethylenic unsaturation capable of reacting with monomers employed in random copolymerization used to make the dispersion polymer. Stabilizer comprises a random copolymer segment of ethylenically unsaturated monomers, some of which are characterized in that homopolymers thereof would be substantially insoluble in the organic liquid used to form the stable dispersion and some of which are characterized in that homopolymers thereof would be substantially soluble in the organic liquid used to form the stable dispersion.

30 Claims, No Drawings

POLYMERIC DISPERSION STABILIZER AND STABLE DISPERSIONS PREPARED THEREFROM

This application is a continuation of Ser. No. 292,963 filed Aug. 14, 1981 which is now abandoned and which, in turn, is a continuation-in-part of Ser. Nos. 199,874 and 199,396 filed Oct. 23, 1980, both now abandoned.

BACKGROUND OF THE INVENTION

This invention relates to new stabilizers for use in dispersions of synthetic polymers in organic liquids, to new processes of making such stabilizers and to dispersions of synthetic polymers in organic liquids stabilized therewith.

More particularly, this invention relates to copolymers adapted for use as polymeric stabilizers in stable dispersions and stable dispersions made therewith, wherein the copolymer bears pendent ethylenic unsaturation capable of reacting with monomers employed in random copolymerization used to make the dispersed polymer of the stable dispersion. Still more particularly, the invention relates to such stabilizers, wherein the stabilizer copolymer comprises a random copolymer segment of ethylenically unsaturated monomers, some of which are characterized in that homopolymers thereof would be substantially insoluble in the organic liquid used to form the stable dispersion and some of which are characterized in that homopolymers thereof would be substantially soluble in the organic liquid used to form the stable dispersion. Finally, the invention relates to stable crosslinked dispersions containing microgel particles which dispersions are prepared by addition polymerization of (a) first and second ethylenically unsaturated monomers each bearing functionality capable of crosslinking with the other and (b) at least one other monoethylenically unsaturated monomer in the presence of (I) organic liquid which is a solvent for the polymerizable monomers, but a non-solvent for the resultant polymer and (II) the above polymeric dispersion stabilizer.

COPENDING APPLICATIONS

Concurrently filed application Ser. No. 292,858, now U.S. Pat. No. 4,415,697 entitled "Paint Composition Including Crosslinked Dispersion Flow Control Additive", assigned to the assignee of this application, claims various paint compositions comprising hydroxy functional film former, crosslinking agent and a flow control additive comprising the stable crosslinked dispersion of this application. This concurrently filed application is a continuation-in-part of Ser. Nos. 199,394, now abandoned, 199,395, now abandoned and 199,761, now abandoned, filed Oct. 23, 1980.

PRIOR ART

Stable dispersions of the type prepared employing stabilizers of this invention, or nonaqueous dispersions as they are typically called, have been developed in recent years in attempts to improve the efficiency of applying protective or decorative coatings to a variety of objects and have been particularly widely used in the coating of motor vehicle bodies and vehicle components. Those skilled in the art will be aware of numerous prior art references relating to nonaqueous dispersion technology. Among the more pertinent prior art references, insofar as this invention is concerned, are those which have taught various improved stabilizers and methods of making the same. These include: U.S. Pat. Nos. 3,317,635 to Osmond et al, 3,514,500 to Osmond et al, 3,607,821 to Clarke, 3,814,720 to Maker et al, 3,814,721 to Maker et al and 4,147,688 to Makhlouf et al.

U.S. Pat. No. 3,317,635 to Osmond et al teaches stabilized dispersions or nonaqueous dispersions stabilized by block or graft copolymers of ethylenically unsaturated monomers with a precursor containing a polymeric chain and an unsaturated group with which the monomer polymerizes in vinyl-type manner to produce a polymeric vinyl chain of a different degree of polarity from the original polymeric chain (Col. 2, lines 1–9). Stable dispersions of synthetic monomers in organic liquids may be made in accordance with Osmond et al by precipitating the polymer in the organic liquid in the presence of the stabilizer such that one polymeric chain is solvated by the organic liquid and another is non-solvated and consequently becomes associated with the non-solvated polymer (Col. 2, lines 50–56).

U.S. Pat. No. 3,514,500 to Osmond et al teaches a stabilizer for nonaqueous dispersions, which stabilizer comprises a polymeric backbone and attached thereto at least five side chains of different polarity than the backbone (See abstract). The side chains are attached to the backbone by a condensation reaction between side chains containing only one reactive group per molecule and a backbone containing at least five complementary reactive groups per molecule (Col. 1, line 71—Col. 2, line 1).

U.S. Pat. No. 3,607,821 to Clarke teaches a stabilizer for nonaqueous dispersions wherein the stabilizer is chemically reacted with dispersed particles of the dispersion (Col. 1, lines 36–42). Each co-reacted stabilizer molecule forms from 1 to 10 (preferably 1 to 4) covalent links with the dispersed polymer (Col. 1, lines 50–52). The covalent links between the stabilizer and the dispersed polymer are formed by reaction between chemical groups provided by the stabilizer and complementary chemical groups provided by the dispersed polymer or by copolymerization reaction (Col. 1, lines 63–67).

U.S. Pat. No. 3,814,720 to Maker et al and assigned to Ford Motor Company, the assignee of this application, teaches nonaqueous dispersions which employ a methylolated addition copolymer of an ethenic monomer and an amide of an unsaturated acid (see abstract and claims).

U.S. Pat. No. 3,814,721, also to Maker et al and also assigned to Ford Motor Company, teaches nonaqueous dispersions which are prepared employing a precursor addition copolymer which is prepared by reacting an active ethenic monomer having a functional epoxy, hydroxy, cyanato, or carboxy group with another active ethenic monomer free of functional groups in an aromatic or alcoholic solvent, followed by addition of an aliphatic liquid in which the polymer is insoluble, followed still further by the addition of a third ethenic monomer having one of such functional groups and a forth ethenic monomer free of such functional groups, such that the aliphatic liquid is a non-solvent for the second addition copolymer which is dispersed throughout the medium (see abstract, examples and claims).

Stable crosslinked dispersions containing microgel particles are well known in the art. U.S. Pat. No. 4,147,688 to Makhlouf et al teaches such crosslinked dispersions wherein crosslinked acrylic polymer microgel particles are formed by free radical addition polymerization of alpha, beta ethylenically unsaturated monocarboxylic acid, at least one other copolymerizable monoethylenically unsaturated monomer and a certain percentage of crosslinking monomer, in the presence of a hydrocarbon dispersing liquid (see abstract, examples and claims). Other crosslinked dispersions containing microgel particles are disclosed in the patent applications and patents referred to in the Makhlouf et al disclosure.

BRIEF DESCRIPTION OF THE INVENTION

The stabilizers of the present invention are copolymers which are adapted for use as a stabilizer in a stable dispersion in an organic liquid. The copolymers bear pendent ethylenic unsaturation and comprise the reaction product of ethylenically unsaturated monomers (A) and copolymer reactant (B). The ethylenically unsaturated monomers (A) bear functionality capable of condensation reaction with complementary functionality of copolymer reactant (B). Copolymer reactant (B) comprises a random copolymer of ethylenically unsaturated monomers, homopolymers of which would be substantially insoluble in a selected organic liquid, ethylenically unsaturated monomers homopolymers of which would be substantially soluble in the same organic liquid, and ethylenically unsaturated monomers bearing complementary functionality capable of condensation reaction with ethylenically unsaturated monomers (A). Ethylenically unsaturated monomers (A) are reacted with copolymer reactant (B) in an amount sufficient to react at least about 10 percent of the complementary functionality of the copolymer. The invention also relates to stable dispersions prepared with the aforementioned stabilizer and methods of making those stable dispersions.

The stable crosslinked dispersions containing microgel particles as prepared in accordance with this invention are formed in the manner described in U.S. Pat. No. 4,147,688 to Makhlouf et al, by addition polymerization of (a) first and second ethylenically unsaturated monomers each bearing functionality capable of crosslinking reaction with the other and (b) at least one other monoethylenically unsaturated monomer, in the presence of (I) organic liquid which is a solvent for the polymerizable monomers, but a non-solvent for the resultant polymer, and (II) the polymeric dispersion stabilizer briefly described above. In accordance with the invention, the crosslinked dispersion is prepared by carrying out the addition polymerization at an elevated temperature such that the dispersion polymer is first formed and then crosslinked.

DETAILED DESCRIPTION OF THE INVENTION

Polymeric Dispersion Stabilizer

The stabilizer of this invention is a copolymer prepared by reacting ethylenically unsaturated monomers (A) and random copolymer reactant (B) through complementary functionality present on the monomers (A) and the random copolymer reactant (B).

Copolymer reactant (B) comprises a random copolymer of (i) between about 20 and about 45, preferably between about 25 and about 40, weight percent of ethylenically unsaturated monomers, homopolymers of which would be substantially insoluble in a selected organic liquid, (ii) between about 40 and about 75, preferably between about 50 and about 65, weight percent of ethylenically unsaturated monomers, homopolymers of which would be substantially soluble in the same organic liquid, and (iii) between about 2 and about 15, preferably between about 5 and about 10, weight percent of ethylenically unsaturated monomers bearing complementary functionality capable of condensation reaction with ethylenically unsaturated monomers (A). The ethylenically unsaturated monomers (A) are reacted with copolymer reactant (B) in an amount sufficient to react at least about 10 percent of complementary functionality of the copolymer.

As used herein, "ethylenically unsaturated monomer" means any monomer which bears ethylenic unsaturation, including doubly unsaturated monomers (e.g., butadiene), and which is capable of polymerizing in a vinyl-type manner.

Condensation reactions between ethylenically unsaturated monomers (A) and complementary functionality of random copolymer reactant (B), as provided by ethylenically unsaturated monomers (iii) used to prepare that copolymer reactant, may be selected from the numerous condensation reactions known to those skilled in the art. Common condensation reaction links are: ester links, especially those formed by ester interchange or reaction such as carboxyl/glycidyl, hydroxyl/acid anhydride or hydroxyl/acid chloride; ether links, especially when formed by addition reactions between alkylene oxides and hydroxyl groups; urethane links, espcially those formed by reaction between isocyanate and hydroxyl; and amide links, especially when formed by amine/acid chloride reactions. By way of example, among the numerous condensation reaction complementary groups are: acid anhydride/hydroxyl; acid anhydride/amine; acid anhydride/mercaptan; epoxide/acid; epoxide/amine; isocyanate/hydroxyl; hemiformal/amide; carbonate/amine; cycloimide/amine; and cycloimide/hydroxyl. Among the numerous monomers which may provide reactive groups either in the case of ethylenically unsaturated monomers (A) or the ethylenically unsaturated monomers (iii) used to prepare the random copolymer reactant are: maleic anhydride; maleic acid; itaconic acid; acid esters of maleic and itaconic acids; glycidyl methacrylate; glycidyl acrylate; hydroxy alkyl methacrylates; acrylamide; methacrylamide; dimethyl aminoethyl methacrylate; vinylidene carbonate, N-carbamyl maleimide, vinylisocyanate, etc.

The first (i) and second (ii) types of ethylenically unsaturated monomers used in preparation of copolymer reactant (B), as noted above, are characterized by the fact that if they were formed as homopolymers they would respectively be substantially insoluble and soluble in a selected organic liquid. It should be appreciated that the organic solvent selected is used herein merely as a guideline for identifying the relative solubility properties of the first two types of monomer components (i) and (ii) of the random copolymer and that it is not necessary that the stabilizer composition be in an organic liquid in order to exist. While it is not essential for the stabilizer to be maintained in an organic liquid, generally speaking the selected organic liquid which is used as a guide for determining the relative solubility properties of monomers (i) and (ii) of the random copolymer reactant used in preparation of the stabilizer will be the same organic liquid in which the stable dispersion is prepared using the stabilizer of the invention. The stable dispersions prepared using the stabilizer will be discussed further hereinafter.

By "substantially soluble" or "substantially insoluble" in a selected organic liquid it is meant that the homopolymers in question would be either soluble or insoluble to the extent of about 90% in said selected organic liquid.

It will be appreciated that since the selected organic liquid used in determining the solubility and insolubility of the first two types of monomers used in the random copolymer is generally the same as the organic liquid in which the stable dispersion is to be formed, the question of relative solubility and insolubility in the particular organic liquid will be determined by the same factors as are used as guidelines when determining which monomers and solvents are to be employed in the preparation of the stable nonaqueous dispersions. To this end, it will be appreciated that there are essentially three types of systems or reasons why a given polymer, or in the case of the determination of monomers for the random copolymer, homopolymers, are either soluble or insoluble in a given organic liquid. First, the homopolymer may be soluble or insoluble because it is polar relative to the organic liquid. Secondly, it may be soluble or insoluble because it is non-polar relative to the organic liquid. Thirdly, it may be soluble or insoluble in all common organic liquids because of its molecular structure and irrespective of relative polarity. Thus, in selecting a monomer which is characterized in that homopolymers thereof would be substantially insoluble in a selected organic liquid, it is necessary to consider the type of organic liquid which is to be employed in making the determination of solubility or insolubility and to select a monomer which when homopolymerized will exhibit the desired insolubility. With respect to the second type of ethylenically unsaturated monomer, i.e., one which is characterized in that homopolymers thereof would be substantially soluble in the organic liquid, it is necessary to select the monomer which when homopolymerized will be soluble in that given organic liquid. The types of monomers, homopolymers of which will be soluble in given types of organic liquids should be apparent to those skilled in the art of nonaqueous dispersions. For a thorough discussion of relative solubilities and insolubilities attention is directed to the above discussed prior art patents.

Generally speaking, when the organic liquid is of a non-polar nature, such as an aliphatic hydrocarbon, suitable monomers, homopolymers of which would be insoluble or substantially insoluble therein, include acrylic monomers selected from (a) esters of $C_1$–$C_3$ aliphatic alcohols and acrylic, methacrylic or ethacrylic acids, (b) acrylic and methacrylic acids, and (c) ethylene and propylene glycol monoesters of acrylic, methacrylic or ethacrylic acids. These are essentially polar monomers or monomers which form polar homopolymers and which would be substantially insoluble in a non-polar solvent such as aliphatic hydrocarbon. Especially preferred for use as this first type of monomer which would be insoluble in an aliphatic hydrocarbon or other non-polar solvent is the polar monomer methylmethacrylate. Exemplary of suitable monomers for use as the second type of monomer characterized by homopolymers thereof being substantially soluble in a non-polar solvent such as an aliphatic hydrocarbon would be esters of $C_1$–$C_{18}$ aliphatic alcohols and acrylic, methacrylic or ethacrylic acids. It will be appreciated that monomers characterized in that they would form homopolymers which are highly polar, could be used in more polar organic liquids such as aromatic hydrocarbons, fatty esters and fatty ketones and still be substantially insoluble therein. Those skilled in the art will appreciate the numerous selections which could be made.

If the selected organic liquid is one which is polar rather than non-polar, then the particular ethylenically unsaturated monomers selected for the first two types (i) and (ii) used in the preparation of random copolymer reactant (B) will differ. Among the numerous polar solvents which will come to the mind of those skilled in the art are various alcohols such as methanol and ethanol, glycols, esters, ethers, polyols and ketones. When using such a polar organic liquid the first type of monomer (i) (that which is characterized by being substantially insoluble in the selected organic liquid) may be selected from numbers monomers which would be apparent to those skilled in the art. Among the long list are hydrocarbons such as styrene, vinyltoluene, divinylbenzene, isoprene, butadiene, isobutylene and ethylene. Also, of course the higher fatty esters of unsaturated acids such as acrylic, methacrylic and ethacrylic acids wherein the alcohol component of the ester contains a long carbon to carbon chain. Preferably these are esters of $C_4$–$C_{18}$ aliphatic alcohols and acrylic, methacrylic or ethacrylic acids. The polar monomers or monomers homopolymers of which would be polar and therefore substantially soluble in such an organic liquid would include numerous monomers including those acrylic monomers selected from (a) esters of $C_1$–$C_3$ aliphatic alcohols and acrylic, methacrylic or ethacrylic acids, (b) acrylic and methacrylic acids and (c) ethylene and propylene glycol monoesters of acrylic, methacrylic or ethacrylic acids.

While, as discussed above, numerous types of ethylenically unsaturated monomers may be employed in the preparation of the stabilizer as any one of the monomers (A) or any of the three types of monomers (i), (ii) or (iii) used in the random copolymerization to form copolymer reactant (B) which reacts with monomers (A), it is preferred that such monomers be acrylic monomers. "Acrylic monomer" as used herein means a monomer based on acrylic, methacrylic or ethacrylic acids. In those cases where complementary functionality is desired for a reaction between monomers (A) and the random copolymer reactant (B), the acid itself may, of course, be employed. Other types of acrylic monomers, which are commonly known to those skilled in the art and which are desirable for use in the preparation of the stabilizer of the invention, are the numerous well known esters of acrylic, methacrylic and ethacrylic acids.

Random copolymer reactant (B), used to prepare the stabilizer of the invention has a number average molecular weight in the range of between about 4,000 and about 15,000, preferably, from about 6,000 to about 10,000. While, ethylenically unsaturated monomers (A) are reacted with the random copolymer reactant (B) in amounts sufficient to react with about 10% of said complementary functionality of the copolymer reactant (B), it is preferred that the reactants be combined in amounts such that monomers (A) react with between about 0.5 and about 3.0 weight percent of the copolymer reactant (B).

Dispersions Generally

The types of stable dispersion for which the stabilizers of the present invention are intended are well known and are commonly referred to as nonaqueous dispersions. To produce such dispersions, the addition polymer which is formed in the solvent must be substantially insoluble in that organic liquid and consequently the nature of the polymer to be dispersed determines the nature of the organic liquid. By the same token, the nature of the polymer to be dispersed will determine the nature of the type of stabilizer and which of the various monomer combinations are employed in the preparation of that stabilizer in accordance with the invention. The question of selection of given organic liquids for particular types of polymers to be dispersed revolves around the same principles as discussed above for determination of various solubilities and insolubilities in the solvents. While any of the various combinations of monomers discussed above may be used in the preparation of stabilizers suitable for preparation of dispersions in accordance with the invention, a particularly preferred stabilizer is one which is used in the preparation of dispersions in aliphatic hydrocarbons. In that case, the monomer, the homopolymer of which is substantially insoluble in the aliphatic hydrocarbon, is methylmethacrylate and the monomer, the homopolymer of which is substantially soluble, is 2-ethylhexylacrylate. The monomers bearing complementary functionalities in that particular preferred type of stabilizer are glycidyl acrylate or glycidyl methacrylate on the one hand and acrylic or methacrylic acid on the other.

The process by which stable dispersions are formed using the stabilizers of the present invention is essentially the same as that which is very well known in the art in the preparation of non-aqueous dispersions using other well known stabilizers. In general, it is anticipated or it may be anticipated that the stabilizer of the invention will adequately stabilize the addition polymer being formed if it is employed in amounts ranging from about 2 to about 20, preferably from about 5 to about 10, weight percent based on the total weight of the dispersion being formed and the weight of the stabilizer itself. It should be appreciated, that the ethylenic unsaturation which is present on the stabilizer itself takes part in the addition copolymerization forming the dispersed polymer.

Crosslinked Dispersion

The stable crosslinked dispersion of microgel particles is prepared by addition polymerization of (a) between about 1 and about 10 mole percent, preferably between about 2 and about 5 mole percent, each of first and second ethylenically unsaturated monomers, each bearing functionality capable of crosslinking with the other and (b) between about 98 and about 80 mole percent, preferably between about 96 and about 90 mole percent of at least one other monoethylenically unsaturated monomer. The addition polymerization is carried out in the presence of an organic liquid which is a solvent for the polymerizable monomers, but a non-solvent for the resultant polymer and in the presence of the aforementioned polymeric dispersion stabilizer. The polymerization is carried out at elevated temperatures such that the dispersion polymer is first formed and then crosslinked.

The crosslinking functionalities on the first and second ethylenically unsaturated monomers (a) can be selected from a wide variety of functionalities which will be apparent to those skilled in the art. Among the preferred pairs of crosslinking functionalities which may be present on the first and second ethylenically unsaturated monomers are: acid and epoxide; epoxide and amine; acid anhydride and hydroxyl; acid anhydride and amine; acid anhydride and mercaptan; isocyanate and hydroxyl; hemiformal and amide; carbonate and amine; cycloimide and amine; cycloimide and hydroxyl; imine and alkoxysilane; etc.

While the first and second ethylenically unsaturated monomers (a) may be any ethylenically unsaturated monomer within the scope of such term as defined hereinbefore, it is preferred that the monomers be acrylic monomers as defined above.

A preferred class of crosslinked dispersions within the scope of the invention is formed by free radical addition copolymerization, in the presence of the polymeric dispersion stabilizer and in the presence of a hydrocarbon dispersing liquid, of: from about 1 to about 10, preferably from about 2 to about 5, mole percent of alpha, beta ethylenically unsaturated monocarboxylic acid; from about 98 to about 80 weight percent of at least one other copolymerizable monoethylenically unsaturated monomer; and from about 1 to about 10, preferably from about 2 to about 5, weight percent of a crosslinking monomer selected from the group consisting of ethylenically unsaturated monoepoxides. The preferred alpha, beta ethylenically unsaturated monocarboxylic acids for use in this class of crosslinked dispersions are acrylic acid and methacrylic acid, with methacrylic acid being especially preferred.

Various other monoethylenically unsaturated monomers may be copolymerized with the acid monomer in the preparation of this class of crosslinked dispersion. Although essentially any copolymerizable monoethylenically unsaturated monomer may be utilized, depending upon the properties desired, the preferred monoethylenically unsaturated monomers are the alkyl esters of acrylic or methacrylic acid, particularly those having from about 1 to about 4 carbon atoms in the alkyl group. Illustrative of such compounds are the alkyl acrylates, such as methylacrylate, ethylacrylate, propylacrylate and butylacrylate and the alkyl methacrylates, such as methylmethacrylate, ethylmethacrylate, propylmethacrylate and butylmethacrylate. Other ethylenically unsaturated monomers which may be advantageously employed include, for example, the vinyl aromatic hydrocarbons, such as styrene, alpha-methylstyrene, vinyl toluene, unsaturated esters of organic and inorganic acids, such as vinyl acetate, vinyl chloride and the like, and the unsaturated nitriles, such as acrylonitrile, methacrylonitrile, ethacrylonitrile and the like.

Although numerous ethylenically unsaturated monoepoxides will come to the mind of those skilled in the art, representative of the most preferred monoepoxides for this class of crosslinked dispersion are glycidyl acrylate and glycidyl methacrylate.

In a particularly preferred crosslinked dispersion embodiment within the aforementioned class, the monomers used in the addition copolymerization to form the dispersed polymer are characterized in that the alpha, beta ethylenically unsaturated monocarboxylic acid is methacrylic acid, the other copolymerizable monoethylenically unsaturated monomer is methylmethacrylate and the crosslinking monomer is glycidyl methacrylate. In this particularly preferred crosslinked dispersion embodiment, the preferred polymeric dispersion stabilizer is one in which ethylenically unsaturated monomers (i) and (ii) used to prepare the copolymer reactant (B) precursor of the polymeric dispersion stabilizer are methylmethacrylate and 2-ethylhexylacrylate respectively, and wherein one of the ethylenically unsaturated monomers (A) or (iii) of copolymer reactant (B) is glycidyl acrylate or glycidyl methacrylate and the other of said ethylenically unsaturated monomers (A) or (iii) is acrylic or methacrylic acid. Most preferred is the case wherein ethylenically unsaturated monomer (iii) of copolymer reactant (B) is glycidyl acrylate or glycidyl methacrylate and ethylenically unsaturated monomers (A) comprise acrylic or methacrylic acid.

The invention will be more fully understood from the following detailed examples which are merely exemplary of the multitude of compositions which fall within the scope of the invention which illustrate the use of the stabilizer compositions of the invention.

EXAMPLE I

A 2-liter flask equipped with a stirrer, thermometer, dropping funnel, and water condenser was charged with 590 grams n-butyl acetate and 0.4 gram t-butyl perbenzoate initiator. The initiator solution was heated to 120° C. While maintaining the temperature at 120° C., a mixture of 496 grams 2-ethylhexyl acrylate, 224 grams methyl methacrylate, 80 grams glycidyl methacrylate, and 4.2 grams t-butyl peroctoate was added dropwise over a period of 3 hours. One hour after the addition, a mixture of 0.84 grams t-butyl peroctoate and 25 grams n-butyl acetate was added and the reaction was allowed to continue for an additional 2 hours. Then a mixture of 1.28 grams hydroquinone, 6.4 grams methacrylic acid, 1.2 grams dimethyl dodecylamine, and 140 grams of n-butyl acetate was added to the reaction mixture. The reaction was held at 120° C. until the acid number was 0.2 mg KOH/gram. The reaction product was a darkly colored solution having a solids content 50.6%, a Gardner viscosity of F, a number average molecular weight of 8545, and a weight average molecular weight of 28,865 determined by gel permeation chromatography using polystyrene calibration.

EXAMPLES 2-7

Following the procedure of Example 1, a variety of stabilizers of various kind and ratio of monomers was prepared. Table I summarizes the monomers ratio and properties of some typical stabilizers.

TABLE I

| Example | M$_1$ Non Polar Monomer | M$_2$ Polar Monomer | M$_3$ Functional Monomer | M$_4$ Complementary Unsaturated Monomer | Ratio of M$_1$/M$_2$/M$_3$/M$_4$ | Gardner Viscosity | Solids Content |
|---|---|---|---|---|---|---|---|
| 2 | EHA | MMA | GMA | MAA | 54/40/6/1 | S | 58.3% |
| 3 | EHA | MMA | GMA | MAA | 59/35/6/2 | T | 59.1% |
| 4 | EHA | MMA | GMA | MAA | 59/35/6/1 | — | 57.1% |
| 5 | EHA | MMA | GMA | MAA | 65/25/10/0.8 | G-H | 53.7% |
| 6 | LA | MMA | GMA | MAA | 65/25/10/1.0 | D | 49.3% |
| 7 | EHA | MMA | GMA | MMA | 64/30/6/1 | N | 57.2% |

Notes:
The following abbreviations are used:
EHA = 2-Ethylhexylacrylate; MMA = Methyl Methacrylate; GMA = Glycidyl Methacrylate; MAA = Methyl Acid; LA = Lauryl acrylate

EXAMPLE 8

A nonaqueous acrylic dispersion polymer was prepared by heating to 90° C. 991 grams heptane, 41 grams methyl methacrylate, 8 grams of stabilizer from Example 5, and 0.7 gram azobis (isobutyronitrile) in a 5-liter flask which was equipped with a stirrer, thermometer, addition funnel, and water condenser. The reaction was held at 90° C. for 30 minutes; then a mixture of 1022 grams methyl methacrylate, 55 grams glycidyl methacrylate, 34 grams methacrylic acid, 3.4 grams dimethyl dodecylamine, 152 grams of stabilizer from Example 5, 427 grams Espesol 260H (a) and 7.7 grams azobis (isobutyronitrile) was added dropwise over a period of 4 hours. One hour after the addition, 0.77 gram azobis (isobutyronitrile) dissolved in 150 grams n-butyl acetate was added. The reaction was allowed to continue for an additional 2 hours. The resulting milky white acrylic dispersion polymer has a solids content of 43.0% and a Ford No. 2 Cup viscosity of 28.9 seconds.

(a) Esperol 260H is an aliphatic hydrocarbon solvent mixture with a boiling point range of 262°-284° F., a specific gravity of 0.731, a kB value of 30 and an aromatic content of about 5 percent. It is manufactured by Charter Chemical Co. of Houston, Tex.

EXAMPLE 9

Using the procedure of Example 8, an acrylic dispersion polymer was prepared using the stabilizer of Example 6. The resulting dispersion has a solids content of 43.5% and a Ford No. 2 Cup viscosity of 26.3 seconds.

EXAMPLE 10

(A) Flow Control Additive I

An acrylic stabilizer copolymer with a composition of 55/35/10/0.8 2-ethylhexyl acrylate/methyl methacrylate/glycidyl methacrylate/methacrylic acid was prepared in accordance with the procedure of Example 1. The copolymer had a I viscosity (Gardner-Holdt) at 50% solids in n-butyl acetate.

A flow control additive was prepared according to the procedure of Example 8 in which 1063 parts of methyl methacrylate, 55 parts of glycidyl methacrylate and 34 parts of methacrylic acid are reacted in the presence of 57 parts of the above acrylic stabilizer solution. The additive had a solids content of 43% in 60/25/15 heptane/VM&P Naptha/butyl acetate.

(B) Silver Metallic Enamel

A silver metallic enamel was prepared by mixing the following ingredients.

| | |
|---|---|
| Acrylic Resin A (a) | 2166 |
| Acrylic Resin B (b) | 1634 |
| Melamine Resin X (c) | 1509 |
| Flow Control Additive I | 640 |
| Aluminum paste (60% aluminium flake) | 175 |
| Polybutyl acrylate (60% in xylene) | 31 |
| Isobutyl acetate | 1000 |
| Ethylene glycol ethyl ether acetate | 745 |

The enamel was sprayed on a primed steel panel and cured for 17 minutes at 265° C. in a forced air oven. The panel had excellent brilliance and distinctness of image due to the even distribution of aluminum flake in the paint. A control enamel with no flow control additive appeared much darker and showed an uneven distribution of aluminum flake or mottling.

(a) Acrylic Resin A is a typical automotive thermoset acrylic resin with a monomeric composition of 37/20/27/15/1 styrene/methyl methacrylate/butyl acrylate/hydroxy propylmethacrylate/acrylic acid. The resin has Y viscosity taken cut to 55% solids in 70/12/18 cellosolve acetate/butanol/toluene.

(b) Acrylic Resin B is an automotive thermoset acrylic resin with a 30/30/20/19/1 styrene/butyl methacrylate/2-ethylhexyl/acrylate/hydroxypropyl methacrylate/acrylic acid composition. The resin had a T viscosity at 50% nonvolatiles in 50/50 cellosolve acetate/isopropyl acetate.

(c) Melamine Resin X is a butylated melamine resin with a U viscosity at 65% nonvolatiles in 2/1 liters of butyl acetate/butyl alcohol and a ASTM D1198 mineral spirits tolerance of 300.

EXAMPLE 11

A white enamel was prepared by mixing the following ingredients.

| | |
|---|---|
| Titanium Dioxide Millbase (d) | 2891 |
| Acrylic Resin C (e) | 1241 |
| Acrylic Resin D (f) | 1099 |
| Melamine Resin X (same as in Ex. 10) | 1261 |
| Polybutyl acrylate (60% in xylene) | 25 |
| Isobutyl acetate | 2276 |
| Ethylene glycol monoethyl ether acetate | 558 |
| Flow Control Additive I | 133 |

A primed panel was sprayed so that a film thickness wedge of 1.7 mils to 3.5 mils was realized after the panel was baked for 17 minutes at 265° F. Sagging of the film began at the 2.5 mil thickness region. A control enamel which did not contain the flow control additive sagged at about 1.9 mils.

(d) The Millbase was prepared from:

| | |
|---|---|
| Titanium dioxide | 600 parts |
| Acrylic Resin D | 250 parts |
| VM & P Naptha | 110 parts |
| Methyl Amyl Ketone | 50 parts |
| Butyl Acetate | 40 parts |
| Toluene | 40 parts |
| Xylene | 8 parts |

(e) Acrylic Resin C is an acrylic copolymer of 30/30/20/18/2 styrene/butyl methacrylate/2-ethylhexyl acrylate/hydroxypropyl methacrylate/acrylic acid. The resin had a Z viscosity at 50% solids in xylene.

(f) Acrylic Resin D is an acrylic copolymer of 28/30/20/20/2 styrene/butyl methacrylate/ethylhexyl acrylate/hydroxpropyl methacrylate/acrylic acid. The resin had a T viscosity at 60% solids in a 1/1 methyl amyl ketone/VM&P Naptha.

EXAMPLE 12

(A) Flow Control Additive II

An acrylic stabilizer with a comonomer composition of 59/35/6/1 ethylhexyl acrylate/methyl methacrylate/glycidyl methacrylate/methacrylic acid was prepared according to the procedure of Example 1. The copolymer had an L viscosity at 58% solids in butyl acetate. A flow control additive was prepared from:

1016 gms. of methyl methacrylate
    52 gms. of glycidyl methacrylate
    32 gms. of methacrylic acid
    186 gms. of acrylic stabilizer
    8.8 gms. of azobisisobutyronitrile
    3.2 gms. of dimethyl dodecanoic amine
    7.4 gms. of octyl neicaptan
    930 gms. of heptane
    394 gms. of VM&P Naptha
    134 gms. of butyl acetate according to the procedure of Example 8. The dispersion had a % nonvolatiles of 43% and a No. 2 Ford Cup viscosity of 29.1 seconds.

(B) Silver Metallic High Solids Enamel

A silver metallic enamel was prepared by mixing the following ingredients:

| | |
|---|---|
| Acrylic Resin E (g) | 3475 |
| Cymel 325 (h) | 1799 |
| RG-82 (i) | 360 |
| Flow Control Additive II | 700 |
| (6.5% solids/total solids) | |
| Aluminum Flake Dispersion (60% Al) | 205 |
| Methyl Ethyl Ketone | 209 |
| Ethylene glycol ethyl ether acetate | 767 |
| Isopropyl alcohol | 330 |
| Ethyl acetate | 250 |
| Diethylene glycol monobutyl ether | 160 |

The enamel was sprayed on a primed metal panel to yield a film with a wedged film thickness of 1.5 to 3.0 after baking at 285° F. for 20 minutes. The paint sagged at the 2.0 mil film thickness and higher. When the paint formula was adjusted to contain 7.5% of the flow control additive, the sag resistance improved to 2.2 mils. Similar paint with no flow control additive sagged at less than 1.0 mil film thickness.

(g) Acrylic Resin E is a 25/23/20/30/2 styrene/butyl methacrylate/ethylhexyl acrylate/hydroxyethyl acrylate/acrylic acid copolymer which has a Z3 viscosity at 78% NV in methyl amyl ketone.

(h) Cymel 325 is a methylated melamineformaldehyde resin available at 80% NV from American Cyanamid Company.

(i) RG-82 is a product of Eastman Chemical Products, Inc. and is described as a reactive diluent with a hydroxyl equivalent weight of 91.

EXAMPLE 13

A nonaqueous acrylic dispersion polymer was prepared by heating to 90° C., 838 grams heptane, 65 grams methyl methacrylate, 4.6 grams azobis (isobutyronitrile) and 11 grams of stabilizer from Example 7 in a 5 liter flask equipped with a stirrer, thermometer, addition funnel, and water condenser. The reaction was held at 90° C. for 30 minutes. Then a mixture of 156 grams hydroxyethyl acrylate, 40 grams methacrylic acid, 467 grams styrene, 303 grams butyl methacrylate, 311 grams ehtylhexyl acrylate, 395 grams of stabilizer from Example 7, 11 grams octyl mercaptan, 211 grams methyl methacrylate and 10 grams azobis (isobutyronitrile) was added dropwise over a period of 4 hours. One hour after the addition, 12 grams azobis (isobutyronitrile) dissolved in 258 grams n-butyl acetate was added. The reaction was allowed to continue for an additional 2 hours. The 200 grams n-butyl acetate was added. The resulting milky white dispersion has a solids content of approximately 52%. The stability of the dispersion was excellent.

In view of this disclosure, many modifications of this invention will be apparent to those skilled in the art. It is intended that all such modifications which fall within the true scope of this invention be included within the terms of the appended claims.

What is claimed is:

1. A stable dispersion in an organic liquid of particles of an addition polymer which are insoluble in said organic liquid, said dispersion being stabilized by a polymeric dispersion stabilizer comprising the reaction product of ethylenically unsaturated monomers (A) and copolymer reactant (B), said ethylenically unsaturated monomers (A) bearing functionality capable of condensation reaction with complementary functionality of said copolymer reactant (B) which comprises a random copolymer of
   (i) between about 20 and about 45 weight percent of ethylenically unsaturated monomers, homopolymers of which would be substantially insoluble in said organic liquid;
   (ii) between about 40 and about 75 weight percent of ethylenically unsaturated monomers, homopolymers of which would be substantially soluble in said organic liquid; and
   (iii) between about 2 and about 15 weight percent of ethylenically unsaturated monomers bearing said complementary functionality capable of condensation reaction with said ethylenically unsaturated monomers (A), said ethylenically unsaturated monomers (A) being reacted with said copolymer reactant (B) in an amount sufficient to react with at least about ten percent of the complementary functionality of said copolymer reactant (B).

2. A stable dispersion as set forth in claim 1 wherein said ethylenically unsaturated monomers (i) and (ii) and said organic liquid are selected such that homopolymers of said monomers would be substantially soluble or insoluble in said organic liquid as a result of the relative polarity of said homopolymers and said organic liquid.

3. A stable dispersion in accordance with claim 2 wherein said organic liquid comprises polar solvent.

4. A stable dispersion in accordance with claim 2 wherein said organic liquid comprises nonpolar solvent.

5. A stable dispersion in accordance with claim 2 wherein at least a portion of said ethylenically unsaturated monomers (A) and at least a portion of said ethylenically unsaturated monomers (i), (ii) and (iii) used in preparation of said copolymer reactant (B) comprise acrylic monomers.

6. A stable dispersion in accordance with claim 1 wherein
   said organic liquid comprises polar solvent,
   said ethylenically unsaturated monomers (i) comprise esters of $C_4$–$C_{18}$ aliphatic alcohols and acrylic, methacrylic or ethacrylic acids, and
   said ethylenically unsaturated monomers (ii) comprise acrylic monomers selected from (a) esters of $C_1$–$C_3$ aliphatic alcohols and acrylic, methacrylic or ethacrylic acids, (b) acrylic and methacrylic acids, and (c) ethylene and propylene glycol monoesters of acrylic, methacrylic or ethacrylic acids.

7. A stable dispersion in accordance with claim 1 wherein
   said organic liquid comprises nonpolar solvent,
   said ethylenically unsaturated monomers (i) comprise acrylic monomers selected from (a) esters of $C_1$–$C_3$ aliphatic alcohols and acrylic, methacrylic or ethacrylic acids, (b) acrylic and methacrylic acids, and (c) ethylene and propylene glycol monoesters of acrylic, methacrylic or ethacrylic acids, and
   said ethylenically unsaturated monomers (ii) comprise esters of $C_4$–$C_{18}$ aliphatic alcohols and acrylic, methacrylic or ethacrylic acids.

8. A stable dispersion in accordance with claim 7 wherein said solvent is selected from aliphatic hydrocarbons, said ethylenically unsaturated monomer (i) is methylmethacrylate, and said ethylenically unsaturated monomer (ii) is 2-ethylhexylacrylate.

9. A stable dispersion in accordance with claim 8 wherein one of said ethylenically unsaturated monomers (A) and (iii) is glycidyl acrylate or glycidyl methacrylate and the other of said ethylenically unsaturated monomers (A) and (iii) is acrylic or methacrylic acid.

10. A stable dispersion in accordance with claim 2 wherein said complementary functionalities on said ethylenically unsaturated monomer (A) and said ethylenically unsaturated monomers (iii) are selected such that they react to form linkages selected from the group consisting of esters, ethers, amides, and urethanes.

11. A stable dispersion in accordance with claim 10 wherein said linkage is an ester formed by reaction of an epoxide and acid.

12. A stable dispersion in accordance with claims 2 wherein said copolymer reactant has a molecular weight in the range of about 4,000 to about 15,000 and said ethylenically unsaturated monomers (A) are reacted with said copolymer reactant (B) in an amount such that monomers (A) react with between about 0.5 and about 3.0 weight percent of said complementary functionality of copolymer reactant (B).

13. A stable dispersion in accordance with claim 1 wherein said dispersion is a crosslinked dispersion containing microgel particles, said dispersion being formed by addition polymerization of
   (a) between about 1 and about 10 mole percent each of first and second ethylenically unsaturated monomers each bearing functionality capable of crosslinking reaction with the other and
   (b) between about 98 and about 80 mole percent of at least one other monoethylenically unsaturated monomer
in the presence of said organic liquid which is a solvent for the polymerizable monomers, but a non-solvent for the resultant polymer, and said polymeric dispersion stabilizer.

14. A stable crosslinked dispersion in accordance with claim 13 wherein said random copolymer reactant (B) employed in preparation of said polymeric dispersion stabilizer is prepared from ethylenically unsaturated monomers (i) and (ii) which are selected such that homopolymers thereof would be substantially soluble or insoluble in said organic liquid as a result of relative polarities of said homopolymers and said organic liquid.

15. A stable crosslinked dispersion in accordance with claim 14 wherein said organic liquid comprises a polar solvent.

16. A stable crosslinked dispersion in accordance with claim 14 wherein said organic liquid comprises a non-polar solvent.

17. A stable crosslinked dispersion in accordance with claim 13 wherein at least a portion of said ethylenically unsaturated monomers (i), (ii) and (iii) used in preparation of said copolymer reactant (B) and at least a portion of said unsaturated monomers (A) which are reacted with said copolymer reactant (B) to form said polymeric dispersion stabilizer comprise acrylic monomers.

18. A stable crosslinked dispersion in accordance with claim 17 wherein said copolymer reactant (B) used in preparation of said polymeric dispersion stabilizer is characterized in that one of said ethylenically unsaturated monomers (i) or (ii) comprises an ester of a $C_4$-$C_{18}$ aliphatic alcohol and acrylic, methacrylic or ethacrylic acid, and the other of said ethylenically unsaturated monomers (i) or (ii) comprises an acrylic monomer selected from (a) esters of $C_1$-$C_3$ aliphatic alcohols and acrylic, methacrylic or ethacrylic acids, (b) acrylic and methacrylic acids, and (c) ethylene and propylene glycol monoesters of acrylic, methacrylic or ethacrylic acids.

19. A stable crosslinked dispersion in accordance with claim 18 wherein said organic liquid comprises aliphatic hydrocarbon and said copolymer reactant (B) used in preparation of said polymeric dispersion stabilizer is characterized in that said ethylenically unsaturated monomer (i) is methylmethacrylate, and said ethylenically unsaturated monomer (ii) is 2-ethylhexylacrylate.

20. A stable crosslinked dispersion in accordance with claim 19 wherein said polymeric dispersion stabilizer is characterized in that one of said ethylenically unsaturated monomers (A) or (iii) is glycidylacrylate or methacrylate and the other of said ethylenically unsaturated monomers (A) or (iii) is acrylic or methacrylic acid.

21. A stable crosslinked dispersion in accordance with claim 14 wherein said polymeric dispersion stabilizer is characterized in that said complementary functionalities on said ethylenically unsaturated monomer (A) and said ethylenically unsaturated monomers (iii) are selected such that they react to form linkages selected from the group consisting of esters, ethers, amides and urethanes.

22. A stable crosslinked dispersion in accordance with claim 21 wherein said polymeric dispersion stabilizer is characterized in that said linkage is an ester formed by reaction of epoxide with acid.

23. A stable crosslinked dispersion in accordance with claim 14 wherein the functionalities of said first and second ethylenically unsaturated monomers (a) used to form the dispersed polymer of said dispersion respectively are selected from the group consisting of: (a) acid and epoxide; (b) epoxide and amine; (c) acid anhydride and hydroxyl; (d) acid anhydride and amine; (e) acid anhydride and mercaptan; (f) isocyanate and hydroxyl; (g) hemiformal and amide; (h) carbonate and amine; (i) cycloimide and amine; (j) cycloimide and hydroxyl; and (k) imine and alkoxysilane.

24. A stable crosslinked dispersion in accordance with claim 33 wherein said organic liquid is an aliphatic hydrocarbon solvent and said first and second ethylenically unsaturated monomers (a) and said at least one other ethylenically unsaturated monomer (b) used in the preparation of the dispersed polymer of said dispersion are acrylic monomers.

25. A stable crosslinked dispersion in accordance with claim 23 wherein said dispersion is formed by free radical addition copolymerization in the presence of hydrocarbon dispersion liquid of from about 2 to about 10 mole percent of alpha, beta ethylenically unsaturated monocarboxylic acid, from about 98 to about 90 mole percent of at least one other copolymerizable monoethylenically unsaturated monomer and from about 1 to about 10 mole percent of crosslinking monomers selected from the group consisting of ethylenically unsaturated monoepoxides.

26. A stable crosslinked dispersion in accordance with claim 25 wherein said monomers used in the addition copolymerization to form said dispersed polymer are characterized in that said alpha, beta ethylenically unsaturated monocarboxylic acid is methacrylic acid, said other copolymerizable monoethylenically unsaturated monomer is methylmethacrylate and said crosslinking monomer is glycidylmethacrylate.

27. A stable crosslinked dispersion in accordance with claim 25 wherein said monomers used in the preparation of said dispersed polymer are characterized in that said alpha, beta ethylenically unsaturated monocarboxylic acid is acrylic acid or methacrylic acid.

28. A stable crosslinked dispersion in accordance with claim 26 wherein said monomers used in the preparation of said dispersed polymer are characterized in that said other copolymerizable monoethylenically unsaturated monomers are alkylacrylates or alkylmethacrylates.

29. A stable crosslinked dispersion in accordance with claim 26 wherein said monomers used in the preparation of said dispersed polymer are characterized in that said other copolymerizable monoethylencially unsaturated monomer is methylmethacrylate.

30. A stable crosslinked dispersion in accordance with claim 29 wherein said ethylenically unsaturated monoepoxide comprises glycidylmethacrylate.

* * * * *